United States Patent
Suman et al.

[11] Patent Number: 5,664,335
[45] Date of Patent: Sep. 9, 1997

[54] VEHICLE COMPASS CIRCUIT

[75] Inventors: Michael J. Suman, Holland; Steven L. Geerlings, Zeeland, both of Mich.

[73] Assignee: Prince Corporation, Holland, Mich.

[21] Appl. No.: 467,624

[22] Filed: Jun. 6, 1995

[51] Int. Cl.[6] ................................................. G01C 17/38
[52] U.S. Cl. ........................ 33/356; 33/355 R; 340/438
[58] Field of Search .......................... 33/355 R, 356, 33/357, 361; 340/438, 440, 425.5, 458, 457, 461

[56] References Cited

U.S. PATENT DOCUMENTS

| | | | |
|---|---|---|---|
| 4,429,469 | 2/1984 | Tsushima et al. | 33/356 |
| 4,953,305 | 9/1990 | Van Lente et al. | 33/356 |
| 4,965,550 | 10/1990 | Wroblewski | 340/461 |
| 5,151,862 | 9/1992 | Nakayama et al. | 33/356 |
| 5,153,558 | 10/1992 | Robinson et al. | 340/438 |
| 5,390,122 | 2/1995 | Michaels et al. | 33/356 |
| 5,511,319 | 4/1996 | Geerlings et al. | 33/356 |

FOREIGN PATENT DOCUMENTS

| | | | |
|---|---|---|---|
| 4-220515 | 8/1992 | Japan | 33/356 |

*Primary Examiner*—G. Bradley Bennett
*Attorney, Agent, or Firm*—Price, Heneveld, Cooper, DeWitt & Litton

[57] ABSTRACT

A compass circuit has a magnetic field sensor adapted to be positioned in a vehicle near a source of varying magnetic fields. A detector is coupled to the compass circuit for providing a signal applied to the compass circuit which responds for displaying the compass heading prior to the magnetic field disturbance to provide accurate heading information. In a preferred embodiment, the detector senses when a door is opened and the compass heading prior to the opening of the door is displayed.

12 Claims, 2 Drawing Sheets

VEHICLE COMPASS CIRCUIT

BACKGROUND OF THE INVENTION

The present invention relates to magnetic direction sensing systems and particularly those for use in vehicles.

U.S. Pat. No. 4,953,305 discloses an electrical compass system for use in a vehicle in which a magnetic sensor, such as a flux-gate sensor, is employed in connection with a microprocessor to provide a digital display of the vehicle heading. The system described in the '305 patent provides continuous automatic calibration of the compass to correct for changes in the detected magnetic field due to the vehicle's magnetism and changes thereto, as well as provides a system which, in effect, filters out magnetic aberrations caused by travel within an area where severe electromagnetic interference may temporarily occur.

In addition to the external magnetic disturbance which may affect the accuracy of display of compass headings, changes in the vehicle's magnetic field also can cause erroneous displays. One such problem is the type encountered when the compass sensor must be mounted in the instrument panel and the vehicle's HVAC system is activated. The fan motor draws significant current and, as the fan speed is varied drawing different amounts of current, the magnetic field caused by the current supplied to the fan motor can adversely affect the accuracy of the compass display. In order to correct for such problem, the compensation system disclosed in U.S. patent application Ser. No. 297,699 filed on August 29, 1994, and entitled VEHICLE COMPASS CORRECTION CIRCUIT (U.S. Pat. No. 5,511,319 was invented. In this system, correction signals are provided to the compass circuit in response to sensed fan motor speed settings to continuously provide accurate heading information regardless of the fan speed setting.

Regardless of the mounting position of the compass sensor, the vehicle's magnetism can also be affected when, for example, a vehicle door is opened. Typically, when the vehicle is underway, the doors are always closed; however, when the vehicle stops and the driver or passenger opens a door, the change in vehicle magnetism due to the movement of the door from a closed to an open position frequently will cause the compass heading to change even though the vehicle is stationary. Although this does not cause a navigational problem for the vehicle operator since the vehicle is not in motion, it can be perceived as a compass error and the confidence in future compass readings when the car is underway diminished. Further, even if the vehicle operator does not perceive the change in vehicle direction as a compass breakdown, it is an annoyance to the vehicle operator and one which has been the subject of complaints to dealers.

Accordingly, it is desirable to correct for this condition and the system of the present invention provides an improved compass circuit and software to due so.

SUMMARY OF THE PRESENT INVENTION

In order to correct the problem of compass display error when one or more doors are opened, particularly when the compass magnetic sensor is located, for example, in close proximity to the door, such as in one of the A-pillars, the system of the present invention includes a compass circuit having a magnetic field sensor and a detector providing signal information indicating a vehicle door has been opened. The detector circuit is coupled to the microprocessor employed with the compass system which responds to signals from the detector to lock the compass display at the heading displayed just prior to opening of the vehicle door when the vehicle is not in operation. One convenient source of signals indicating a door open is the courtesy light conductor which can be associated with a door actuated switch or can be a signal on a vehicle multiplex system. By providing a continuous, stable heading of the last direction of the vehicle prior to opening a door, the vehicle compass display will accurately display the vehicle heading when it is stationary and a door is opened, and any perceived compass error due to a change of display is eliminated.

These and other features, objects and advantages of the present invention will become apparent upon reading the following description thereof together with reference to the accompanying drawings.

DETAILED DESCRIPTION OF THE PREFERRED EMBODIMENT

Figure 1:
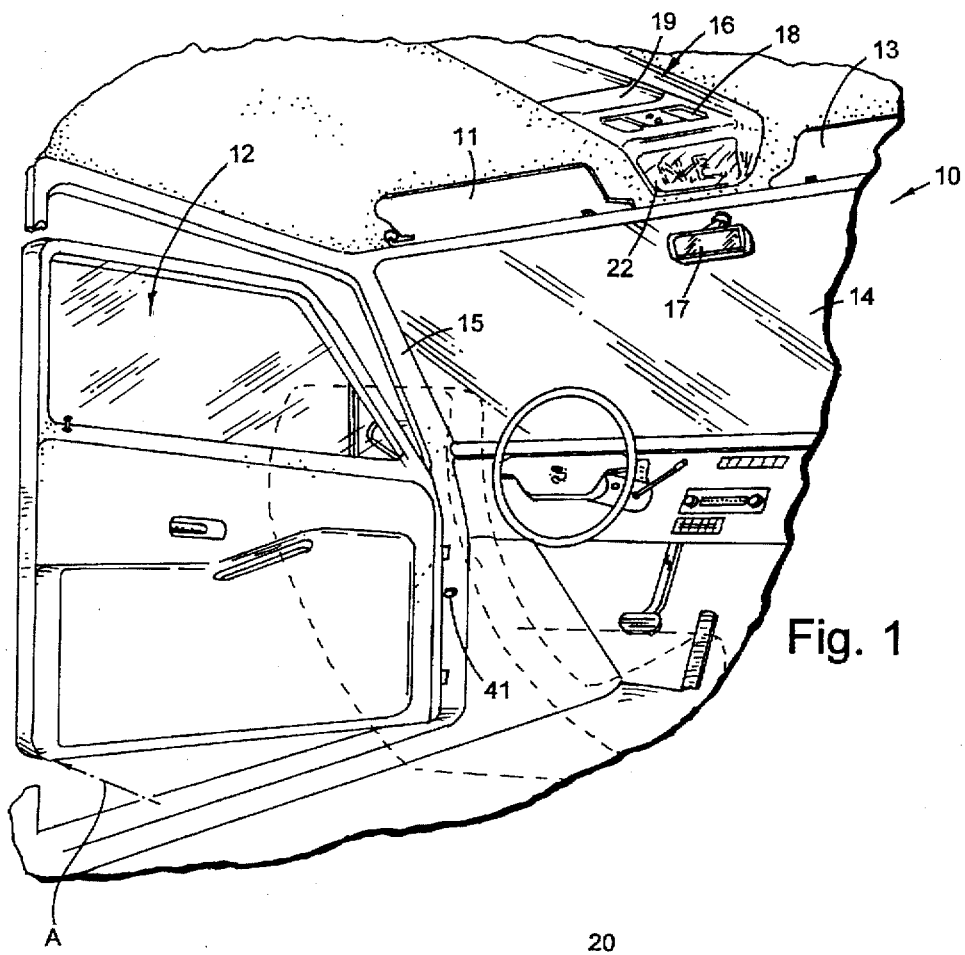
FIG. 1 is a fragmentary perspective view of a vehicle showing the driver's side door and an electrical compass of the present invention installed in the vehicle.

Referring initially to FIG. 1, there is shown a vehicle 10 such as an automobile and the front driver's side area including the door 12 located adjacent the A-pillar 15 and windshield 14. The vehicle includes an overhead console 16 for a variety of vehicle accessories including map lamps 18, a sunglass storage compartment 19 and an electronic compass embodying the present invention and having a display 22 conveniently located between the pair of visors 11, 13 and above rearview mirror assembly 17.

Figure 2:
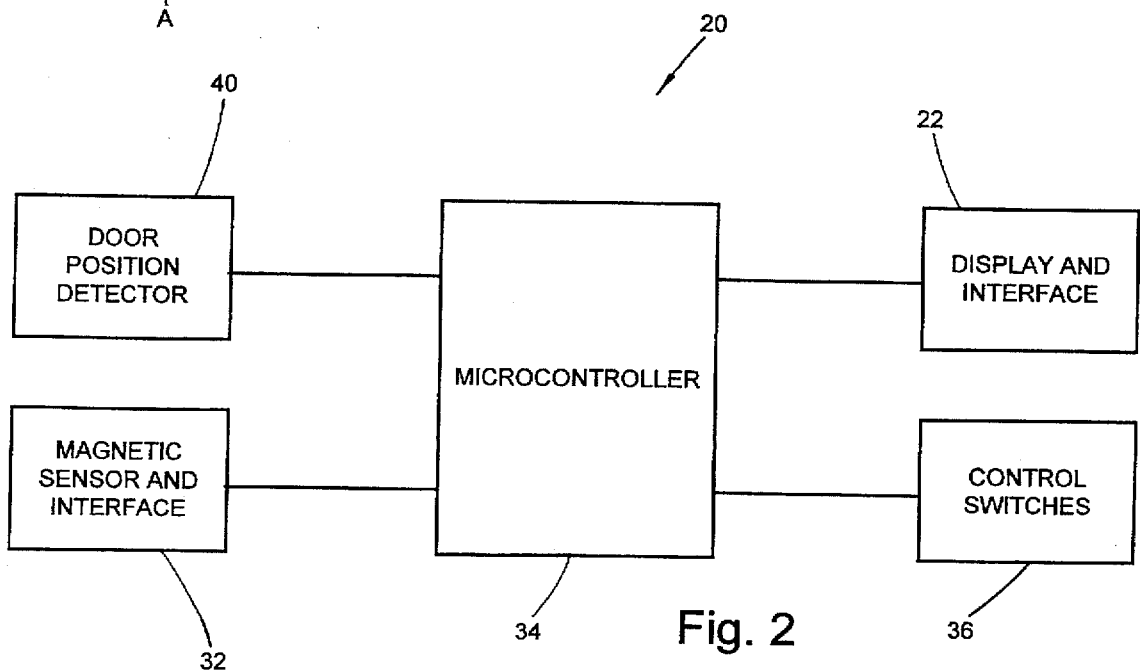
FIG. 2 is an electrical circuit diagram in block form of the compass system of the present invention.

The electronic compass 20 mounted within the console 16 is shown in FIG. 2 and includes a magnetic field sensor 32, such as a flux-gate sensor, which detects ambient magnetic fields. The compass 20 can be of the type disclosed in U.S. Pat. No. 4,953,305, issued on Sep. 4, 1990, and entitled VEHICLE COMPASS WITH AUTOMATIC CONTINUOUS CALIBRATION, the disclosure of which is incorporated herein by reference. Such compass compensates for the vehicle's residual magnetism, variation in the earth's magnetic field and, in effect, filters momentary external field interferences which would cause an erroneous display.

In addition to these compensation and correction controls and that disclosed in the above identified U.S. patent application Ser. No. 297,699, when the door 12 of the vehicle is opened, as indicated by arrow A in FIG. 1, and the car is stationary, the effect of the vehicle's residual magnetism can change significantly and may cause the compass display to change heading even though the car is stationary. This somewhat distracting event, as noted above, can be interpreted by the vehicle operator as a compass malfunction requiring servicing. Although the prior art compass as disclosed in the '305 patent accommodates for external rapid magnetic interference phenomena, the opening of the door can be a relatively slow event which will not trigger the rate of change of detected magnetic field thereby resulting in a perceived change in vehicle direction when the vehicle is stationary. The circuit and software shown in FIGS. 2 and 3 overcome this problem and are now described.

Turning now to FIG. 2, there is shown a block electrical diagram of compass 20, the details of which are disclosed in U.S. Pat. No. 4,953,305. The compass includes a magnetic sensor and associated interface circuits 32 coupling the sensor to a microcontroller 34. The magnetic sensor can be a flux-gate type sensor, a magnetoinductive sensor, a magnetoresistive sensor or other device which can sense the earth's magnetic field and provide signals representative thereof to the microcontroller 34. The sensor selected will require signal conditioning to provide a signal format to the microcontroller data input in a conventional manner known to those skilled in the art. The microcontroller in the preferred embodiment of the invention was a 6805 Motorola microcontroller B-6 version which includes on-board memory and A-to-D converters and which is programmed to provide automatic compensation and variation correction as disclosed in U.S. Pat. No. 4,953,305. The microcontroller receives control input signals from a plurality of switches indicated by block 36 which may, for example, include a compass on-off control, a display control switch for English or metric display of the temperature information also associated with the compass, or variation correction input information. The microcontroller 34 is coupled to an interface and display 22 which may comprise a vacuum fluorescent, LED, LCD or other conventional electronic display in common use in the vehicle environment.

Coupled also to a suitable data input of the microcontroller 34 is the door position detector 40 which provides the microcontroller information corresponding to the status of the vehicle's doors and, thus, an indication of magnetic field disturbance which may be caused by the opening of one or more doors. Detector 40 may include the courtesy light door operated switch 41 (FIG. 1) and conventional signal conditioning circuits to utilize the courtesy light signal with the microprocessor. Alternatively, a signal from a vehicle's multiplex bus indicating a door has been opened can serve as the door position signal source 40. Lamps 18 serve also as the courtesy lamps and are actuated by a supply voltage when switch 41 is actuated indicating a door is opened. The microcontroller 34 is programmed in the same manner as disclosed in the above identified U.S. Pat. No. 4,935,305 to provide for compensation and variation correction and for preventing external field disturbances from affecting the compass display. The program is modified, however, to incorporate the correction system of this invention as now described in connection with the flow diagram of FIG. 3.

Figure 3:
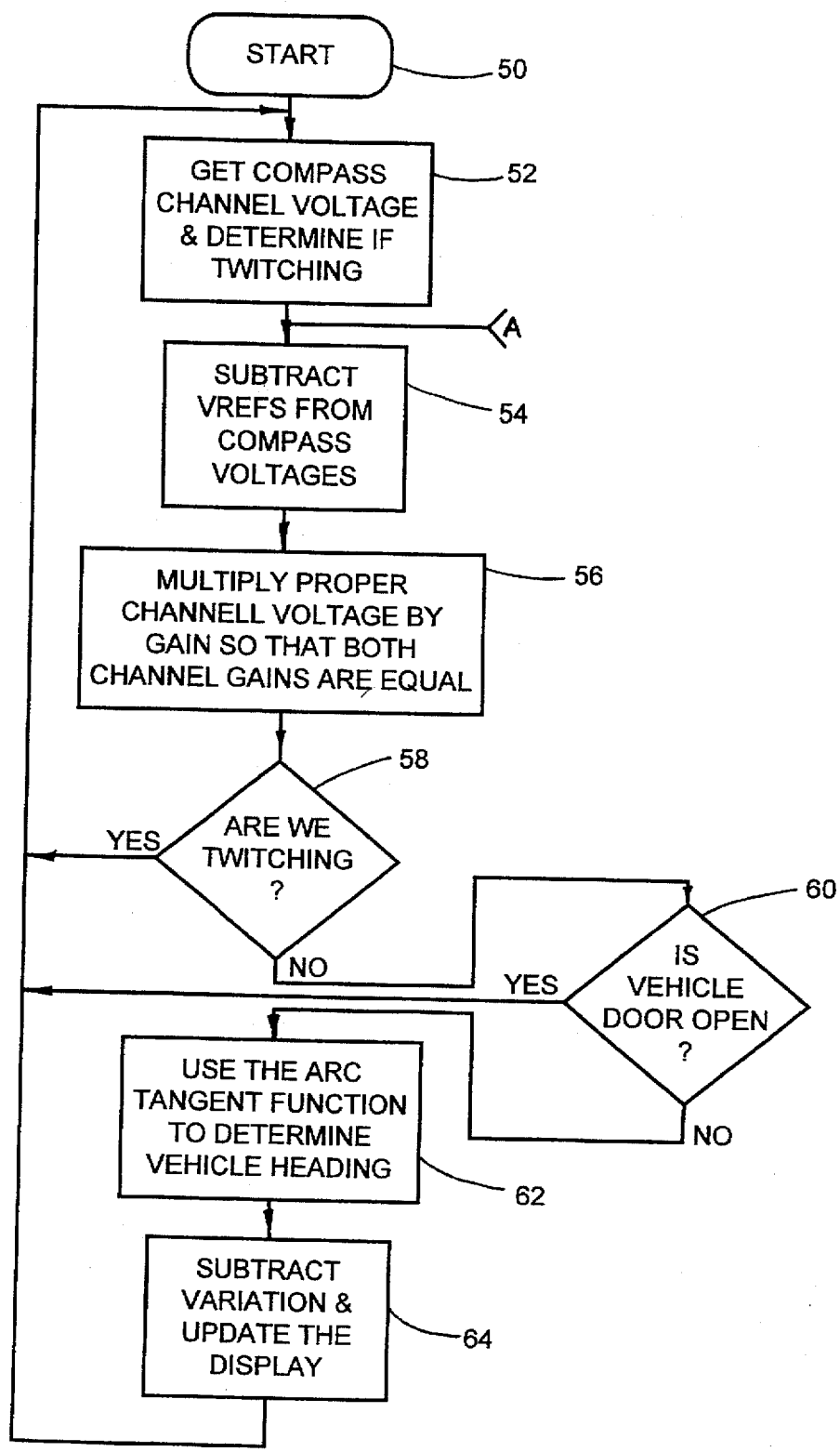
FIG. 3 is a flow diagram of the programming of the microcontroller to provide compass heading correction according to the present invention.

FIG. 3 shows the main program for the microcontroller 34. Upon initialization as indicated by block 50, the program obtains the signals from the magnetic sensor as indicated by block 52. Thus, the signal output voltages on the two channels of signals from the X and Y axes of the magnetic field sensor are read. The program also tests in block 52 to determine if any external magnetic field disturbances such as caused by passing under power lines or over bridges is occurring and the normal calibration information from the calibration sub-routine is read and enters the main program as indicated by arrow A in FIG. 3. The determined reference voltages are subtracted from the detected voltages as indicated by block 54 which includes the correction signal from the normal compensation as well as any other correction signals, such as from a fan speed detection correction circuit as disclosed in the above identified patent application Ser. No. 297,699.

Next, the program must assure that the gain for each the X and Y chapels of the compass sensor are equal as indicated by block 56 and determine whether or not, due to external magnetic field interference, twitching has occurred as determined by block 58. If a rapidly changing magnetic field disturbance is occurring, the program returns to the input of block 52 maintaining the compass heading display at the direction displayed prior to the existence of an external magnetic field disturbance. If no such external field disturbance is detected, the program tests, as indicated by block 60, whether or not a vehicle door is open based upon the signal information from circuit 40. If no door is opened, the compass heading is determined through the conventional arc tangent function as indicated by block 62 to provide display signal information signals from the raw data and the variation from true north information is factored into the display output control signals as indicated by block 64 and the display is updated with such final signal information.

If, however, a door is opened as tested by block 60, the program returns to the input of block 52 maintaining the displayed compass heading just prior to the opening of the door. If for some reason the door is opened rapidly and the program detects the rapidly changing magnetic field associated therewith as twitching, the display is frozen at the current heading by the test from block 58. The next pass through the program will provide a "no" decision by this block but a "yes" decision in block 60 to continue showing the vehicle's correct heading with the door open.

The vehicle's magnetic field change due to opening of a door or other closure member, such as a trunk, hatchback, tailgate, hood or the like, can be detected and the heading display frozen at the vehicle's heading prior to the opening of the closure member. Also, the vehicle's magnetism may change in the area of a roof mounted magnetic field sensor when, for example, the courtesy or vanity mirror lamps are illuminated. The microcontroller can test for these conditions and assures that the correct vehicle heading is displayed, preventing spurious and distracting changes in the heading display when no change should occur.

It will become apparent to those skilled in the art that various modifications to the preferred embodiment of the invention as described herein can be made without departing from the spirit or scope of the invention as defined by the appended claims.

The embodiments of the invention in which an exclusive property or privilege is claimed are defined as follows:

1. A vehicle compass correction circuit for correcting for vehicle generated internal varying interfering magnetic fields comprising:
    a compass circuit including a magnetic field sensor and display for displaying direction indicating information detected by said magnetic field sensor; and
    a detector for providing signals representing the closure state of at least one vehicle closure member, said detector coupled to said compass circuit to provide such status information and wherein said compass circuit responds to said signals to display a vehicle heading unaffected by the opening of a vehicle closure member.

2. The electrical circuit as defined in claim 1 wherein said closure member is a door and said detector includes a courtesy light switch for actuation by a vehicle door.

3. The electrical circuit as defined in claim 2 wherein said compass circuit includes a microcontroller having a data input terminal coupled to said detector for receiving signals therefrom.

4. A vehicle compass circuit for correcting for varying interfering magnetic fields generated by the use of a vehicle, said circuit comprising:
    a magnetic field sensor for providing signals representative of the vehicle heading;
    a display for displaying this vehicle heading;

a microcontroller coupled to said sensor and to said display for displaying direction indicating information detected by said magnetic field sensor; and a source of signals coupled to said microcontroller to provide an indication that the vehicle's internal magnetic field has changed without a change in vehicle heading, wherein said microcontroller responds to said signals to display the last heading prior to this change in the vehicle's internal magnetic field.

5. The electrical circuit as defined in claim 4 wherein said source of signals comprises a detector circuit for detecting vehicle internal magnetic field changes.

6. The electrical circuit as defined in claim 5 wherein said detector circuit includes a door actuated switch.

7. The electrical circuit as defined in claim 4 wherein said source of signals comprises a courtesy light signal provided when a door is opened.

8. A vehicle compass including a circuit for correcting temporary changing levels of local magnetic field disturbances caused by operation of the vehicle, said compass comprising:

a magnetic field sensor for positioning in the vehicle in proximity to a source of varying magnetic field disturbance;

a detector providing signals identifying the magnetic field disturbance;

a display for displaying the detected vehicle heading; and a microcontroller coupled to said sensor, to said detector and to said display and responsive to signals from said detector for displaying the last vehicle heading prior to a magnetic field disturbance.

9. The compass as defined in claim 8 wherein the source of magnetic field disturbance is movement of a vehicle door.

10. The compass as defined in claim 9 wherein said detector includes a door actuated switch.

11. A method of preventing erroneous electronic compass heading displays when a door of a vehicle is opened comprising:

providing an electronic compass for a vehicle;

detecting when a vehicle door has been opened; and after the door is opened, displaying the last known vehicle heading prior to the vehicle door being opened.

12. The method as defined in claim 11 wherein said detecting step includes sensing the voltage of a door actuated courtesy lamp circuit.

* * * * *